UNITED STATES PATENT OFFICE.

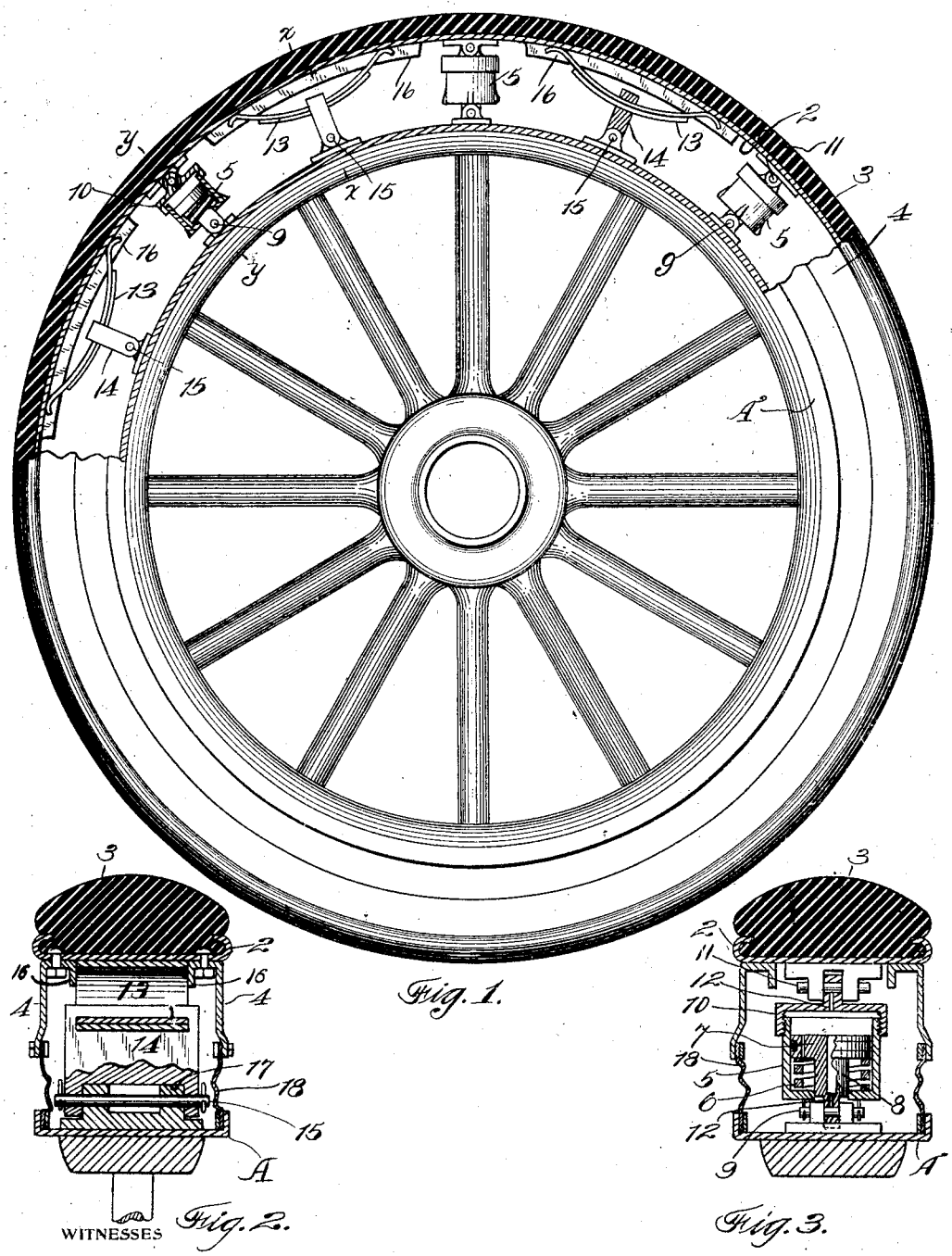

MORRIS W. ROSENSHINE, OF SAN FRANCISCO, CALIFORNIA.

VEHICLE-WHEEL.

958,439.  Specification of Letters Patent. Patented May 17, 1910.

Application filed November 7, 1908. Serial No. 461,458.

*To all whom it may concern:*

Be it known that I, MORRIS W. ROSENSHINE, citizen of the United States, residing in the city and county of San Francisco and State of California, have invented new and useful Improvements in Vehicle-Wheels, of which the following is a specification.

My invention relates to vehicle wheels, and pertains especially to a resilient wheel for use in automobiles and vehicles generally.

The object of the invention is to provide a wheel which shall be simple, practical, and durable, and which will provide by a novel system of springs the desired degree of resiliency ordinarily possessed by pneumatic tired wheels. In connection with such a construction of wheel, I employ novel means for producing durability, rigidity and traction of the wheel, at the same time preserving the necessary flexibility.

The invention consists of the parts and the construction and combination of parts as hereinafter more fully described and claimed, having reference to the accompanying drawings, in which—

Figure 1 is a side elevation partially in section. Fig. 2 is a transverse section on line X—X, Fig. 1. Fig. 3 is a transverse section on line Y—Y, Fig. 1.

A represents the inner rim portion of my improved wheel and 2 the outer rim or tread portion, these two rims being suitably spaced apart and yieldingly connected, in a manner shortly to be described. The outer rim 2 is of metal, and is preferably provided with a suitable resilient tread portion 3 of rubber or the like. Upon the inside of the rim 2 are suitably secured the annular side flanges 4. Between the rims, and at suitable intervals around the circumference of the wheel, are pivotally attached the spring cylinder casings 5; these casings 5 each housing a spring 6 which is acted upon by a plunger 7 and its rod 8, which latter is pivotally connected at 9 to the inner rim A. One end of the cylinder is closed except for an opening suitable to pass the plunger rod 8, and the other end of the cylinder is closed by an adjustable screw cap 10 which pivots at 11 in suitable lugs on the inside of the outer rim. The interior of the cylinder behind the plunger 7 may be filled with a suitable lubricant which may issue in small quantities through appropriate ports 12, in the operation of the wheel as it travels over the ground. By using the screw cap 10, a nice adjustment of the springs 6 may be had when the wheel is assembled.

Coöperating with the springs 6 and their pivoted cylinders and pistons are a series of semi-elliptical springs 13 which are each fixed to a block 14, and which block is suitably pivoted at 15 to the inside rim A, the ends of the springs 13 being adapted to bear slidably at points on opposite sides of their support 14 on the inside of the outside rim and between the flanges 4; preferably, the springs 13 working on a suitable reinforced bearing plate and between the lateral guides 16. The springs 13 are preferably arranged alternately with the articulated spring connectors 5, and they press the two rims apart in opposition to the action of the springs 6. As there is a great deal of wear and shearing strain on the parts in a wheel of this sort, I have designed the blocks 14 with suitable bearings so that the strain will not come directly on the pivots 15, but will be exerted by the blocks directly against the faces of the lugs 17, through which and the blocks 14 the pivot pins 15 pass. That is to say, the contiguous faces of a block 14 and a lug 17 are made concentric with a pivot 15, and the thrust due to the compression of a spring 13 will be resisted directly by a lug 17.

The spring cylinders 5 with their inclosed springs 6 and connecting members 7—8 form a flexible connection between the two rims, whereby the necessary limited amount of circumferential movement of the outer rim with respect to the inner rim is permitted; and at the same time an appropriate articulated connection is provided between the two rims, which will insure the necessary traction, relieve the springs 13 of undue strain, and allow the two rims to accommodate themselves to the varying degrees of eccentricity incident to the travel of the wheel along the street or roadway. Preferably the space between the rims is walled in, to protect the springs from dirt and moisture, by suitable means, as the annular flexible webs 18 which are secured at their edges to the respective sides of the two rims.

With the wheel resting on the ground and supporting its load, the springs 13 which are nearest to the ground, and the springs 6 which are at the top of the wheel, are all on compression, and consequently at no one time is all the load borne by either the springs 13 or by the springs 6. That is to say, whenever the space between the two rims nearest to the ground is narrowed by reason of a weight on the wheel, so that the load is taken by the springs 13, the space at the top of the wheel is widened, which causes the pistons 7 to bear with greater force on their springs 6, so that the load is really supported at both the top and bottom of the wheel, and on the outer rim 2. In case of the sudden starting up or reversing of the wheel, the pivoted cylinders 5 with their inclosed spring connections allow these connecting parts to assume different angles and avoid shock and undue strain on any of the parts, by reason of the fact that these connectors are capable of a limited amount of extension in the direction of their length.

This wheel has been put to a practical and successful test.

It is manifest or possible that the construction herein specified may be varied without departing from the principle of the invention, and I desire it to be understood that the invention is not limited to any specific form or arrangement of parts, except in so far as such limitations or their mechanical equivalents are specified in the claims.

Having thus described my invention, what I claim and desire to secure by Letters Patent is—

1. In a vehicle wheel, the combination with outer and inner rims, of cylinder members pivoted to one rim, pistons in said cylinders and the stems of said pistons pivoted to the other rim, said cylinder members being closed at one end and centrally pierced at the opposite end to admit the stems of the pistons, helical springs within the cylinders and acting as a cushion to the respective pistons, and other spring members alternating with the spring-carrying cylinders and pivoted to one of said rims and having a sliding bearing on the other rim and acting in opposition to the springs in said cylinders.

2. A vehicle wheel having outer and inner rims, cylinders pivoted to one rim having closed outer ends and having inner ends closed except for a central opening, pistons in the cylinders having stems pivotally connected to the other rim, springs interposed between the undersides of the pistons and the inner wall of the adjacent end of the cylinder, rocking supports alternating with the cylinders and pistons and carried by one rim, and spring supporting members engaged at their central portions by said rocking supports and having their ends bearing against the outer rim.

3. The combination with a vehicle wheel having outer and inner rims, of semi-elliptical springs, lugs projecting from the inner rim, blocks embracing said lugs and pivot pins passing through the blocks and lugs, the outer ends of the blocks engaging the central portion of said springs, said lugs adapted to receive the thrust due to the compression of the springs whereby the strain is removed directly from the pivots about which the blocks are turnable, the ends of the springs bearing against the outer rim on each side of the blocks, and articulated connections alternating with the springs and having a yieldable, telescopic movement between the rims.

4. The combination in a vehicle wheel having outer and inner rims, of semi-elliptical springs each secured centrally to a block, said blocks pivotally connected with one of the rims, with the end of each spring bearing against the other rim on each side of its supporting block, lugs on the inner rim to which the blocks are pivotally connected, said lugs serving to resist the thrust due to the compression of the springs and thereby relieving the pivots of the blocks of strain, and articulated connections between the rims, said articulated connections between the two rims and alternating with the springs, and including spring members acting in opposition to said semi-elliptical springs.

5. The combination in a vehicle wheel having outer and inner rims, of semi-elliptical springs each secured centrally to a block, said blocks pivotally connected with one of the rims, with the end of each spring bearing against the other rim on each side of its supporting block, and articulated connections between the rims, said articulated connections comprising each a cylinder, a piston in the cylinder, the stem of the piston passing out through an opening in one end of the cylinder, said stem pivotally connected with one of the rims, a spring acting against the piston and cylinder and surrounding said stem, and an adjustable screw-threaded head closing the opposite end of the cylinder, and said head pivotally connected with the other rim.

6. The combination in a vehicle wheel having outer and inner rims, of semi-elliptical springs each secured centrally to a block, said blocks pivotally connected with one of the rims, with the end of each spring bearing against the other rim on each side of its supporting block, articulated connections between the rims, said supporting blocks for the springs having a hinged bearing independent of and concentric with the pivot, and flexible walls between the rims and housing in said springs and connections.

In testimony whereof I have hereunto set my hand in presence of two subscribing witnesses.

MORRIS W. ROSENSHINE.

Witnesses:
CHARLES A. PENFIELD,
FREDERICK E. MAYNARD.